United States Patent Office 2,875,215
Patented Feb. 24, 1959

2,875,215

1-ACYLTHIO SUBSTITUTION PRODUCTS OF 3,17-DIOXYGENATED ANDROSTANE DERIVATIVES

Raymond M. Dodson, Park Ridge, and Robert C. Tweit, Wilmette, Ill., assignors to G. D. Searle & Co., Chicago, Ill., a corporation of Delaware No Drawing. Application May 24, 1957
Serial No. 661,294

10 Claims. (Cl. 260—397.3)

The present invention relates to 1-acylthio substitution products of 3,17-dioxygenated androstane derivatives. The compositions of this invention include those which can be represented by the general structural formula

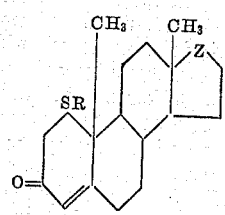

as well as 4,5-dihydro derivatives thereof. In this formula R represents a lower alkanoyl radical, selected from among such lower alkanoyl radicals as formyl, acetyl, propionyl, butyryl, valeryl, hexanoyl, heptanoyl, octanoyl, and branched-chain isomers thereof. These alkanoyl radicals are acyl radicals of alkanoic acids containing fewer than nine carbon atoms. In the foregoing formula Z can represent a carbonyl (CO) group, a hydroxymethylene (CHOH) group, or a group of the formula

CHOR' wherein R' is a lower alkanoyl radical, as illustrated hereinabove. Equivalent to the ketones thus encompassed, for the purposes of this invention, are functionally-converted derivatives thereof such as their cyclic ketals.

In the manufacture of the compositions of this invention, a lower thioalkanoic acid is reacted with a selected 1-androstene or 1,4-androstadiene derivative. For this purpose a lower thioalkanoic acid is defined as a compound having the formula

R″COSH in which R″ represents hydrogen or a lower alkyl radical. Androstene and androstadiene derivatives suitable for reaction therewith include compounds of the structural formula

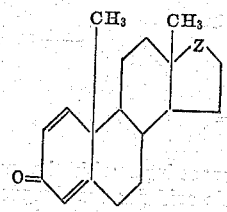

and 4,5-dihydro derivatives thereof, in which Z is defined as hereinbefore.

The addition reaction proceeds fairly rapidly at elevated temperatures, such as those in excess of 50° C., and can optionally be carried out under the influence of ultraviolet light. In carrying out the addition reaction with lower boiling thioalkanoic acids, such as thioacetic acid, it is convenient to conduct the reaction at the reflux temperature of the reaction mixture; whereas with higher boiling thioalkanoic acids it is convenient to conduct the reaction at a temperature of about 90–100° C. Heating periods of up to a few hours are sufficient to achieve substantial conversion to the desired reaction products. Typically, the desired compound is obtained in a satisfactory state of purity by direct filtration of the cooled reaction mixture, preceded, where necessary, by removal of excess thioalkanoic acid.

Since thioalkanoic acids are effective acylating agents, employment as a starting material of an androstene or androstadiene having a free hydroxyl group at position 17 leads to the formation of a substantial amount of a 17-acyloxy derivative after a prolonged reaction time. Several alternative methods are available to prepare a purified 17-acyloxy derivative of this invention. Representatively, 1-acetylthio-17-acetoxy-4-androsten-3-one can be prepared by reacting thioacetic acid with 17-acetoxy-1,4-androstadien-3-one, by reacting 17-hydroxy-1,4-androstadien-3-one with thioacetic acid at the reflux temperature for about 2 hours and then conducting a separate acetylation operation with pyridine and acetic anhydride, or by reacting 17-hydroxy-1,4-androstadien-3-one with thioacetic acid at the reflux temperature for about 24 hours, in each case followed by separation of the desired reaction product.

The addition of thioalkanoic acids to the 1,2-double bond of the starting materials employed in the practice of this invention proceeds under steric influences such that of the stereoisomers formed, one is obtained in predominant amount. The isomer obtained in predominant amount has in each case been characterized herein as possessing the alpha configuration of the 1-acylthio group. This configuration has been designated in order to provide a more complete exposition of the present invention, and in order that the specification shall constitute a more useful contribution to the art. However, the designated configuration of the 1-acylthio group is based upon an analysis of molecular rotation data presently appearing in the chemical literature, and is therefore not to be interpreted except in relation to the state of the art presently known to organic chemists. It will be apparent that no part of the specification will be materially defective if it should later be established that the configuration is the opposite of that deducible from data presently available to workers in the field.

The compounds of the present invention have useful biological properties, as shown by the hormonal and other pharmacological effects which they produce. For example, they are androgenic and anabolic agents, effective in promoting the metabolic utilization of nitrogen. In other applications, they can be employed as selective antihormonal agents. Thus, they are effective in inhibiting the salt retention caused by the administration of adrenocortical hormones. Upon co-administration with desoxycorticosterone, they markedly reduce the salt-retaining effect produced by the latter hormone.

This invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples, temperatures are given in degrees centigrade (° C.), pressures in millimeters (mm.) of mercury, and quantities of materials in parts by weight.

Example 1

A solution of 1 part of 1-androstene-3,17-dione in 2 parts of thioacetic acid is heated under reflux and irradiated with ultraviolet light for 2 hours. During this reaction period a solid product crystallizes from the solution. This product is collected by filtration of the cooled solution, and washed with ether. If a higher yield of product is desired, it is advantageous to remove part of the thioacetic acid by distillation, or to add ether to the cooled solution, prior to filtration. A more highly purified product can be obtained by recrystallization from a mixture of acetone and ether. This compound is 1α-acetylthioandrostane-3,17-dione, which melts at about 219–220° C. and has a specific rotation of about +138° in chloroform solution. The structural formula is

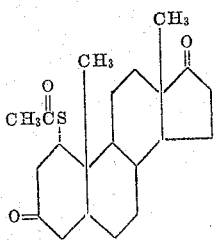

Upon refluxing a mixture of 17β-acetoxy-1-androsten-3-one and thioacetic acid according to the same procedure, the product formed is 1α-acetylthio-17β-acetoxy-androstan-3-one.

*Example 2*

A solution of 10 parts of 17β-hydroxy-1,4-androstadien-3-one (1-dehydrotestosterone) in 6 parts of thioacetic acid is heated under a reflux and irradiated with ultraviolet light for a period of 1½ hours. Benzene (45 parts) is added and the solution is concentrated by distillation under reduced pressure to a very small volume. Removal of volatile components is completed by drying the residue at 0.5 mm. pressure until only a glassy residue remains. This residue is 1α-acetylthio-17β-hydroxy-4-androsten-3-one, as shown by its elemental analysis and its infrared absorption spectrum, which exhibits an absorption maximum characteristic of a hydroxyl group at about 2.9 microns, and an absorption maximum characteristic of an acetylthio group at about 5.95 microns, but lacks absorption maxima in the vicinity of 3.8 and 5.8 microns, which, if present, would be respectively indicative of a free thiol group and an unconjugated carbonyl group such as that found in an acetoxyl radical. The structural formula is

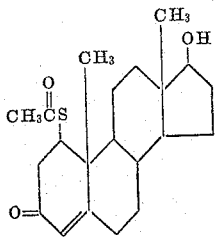

*Example 3*

A solution of 2 parts of 17β-hydroxy-1,4-androstadien-3-one in 1 part of thioacetic acid is heated under reflux and irradiated with an ultraviolet light for 1½ hours. The solution is concentrated almost to dryness by distillation under reduced pressure. A solution of the residue in 10 parts of pyridine and 4 parts of acetic anhydride is allowed to stand at about 25° C. for 16 hours, after which it is diluted with several times its volume of dilute sodium bicarbonate solution and extracted with two portions of methylene chloride. The combined methylene chloride extract is washed with water, rendered anhydrous, and concentrated to dryness by distillation under reduced pressure. The residue is crystallized from ether and then recrystallized from a mixture of acetone and ether to afford 1α-acetylthio-17β-acetoxy-4-androsten-3-one which melts at about 172–174° C. and has a specific rotation of about +102° in chloroform solution. The structural formula is

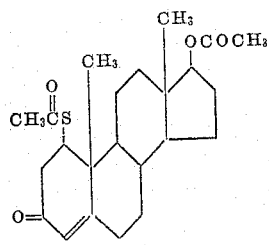

*Example 4*

A solution of 5 parts of 17β-hydroxy-1,4-androstadien-3-one in 10 parts of thioacetic acid is heated under reflux and irradiated with ultraviolet light for 24 hours. (The relatively long reaction time not only causes the entry of the acetylthio group at position 1, but also leads to extensive esterification at position 17.) The cooled, brown solution is diluted with chloroform, washed with several portions of water, which are discarded, and concentrated to dryness under reduced pressure. A solution of the residue in a small quantity of benzene is poured onto a chromatography column prepared from 250 parts of silica. After the column is washed with about 1100 parts of benzene and about 1100 parts of a 2 volume percent solution of ethyl acetate in benzene, elution with a 10 volume percent solution of ethyl acetate in benzene affords the principal product of the reaction. This compound can be further purified by recrystallization from a mixture of acetone and ether. It is 1α-acetylthio-17β - acetoxy-4-androsten-3-one, identical with the product of Example 3.

*Example 5*

17β-propionoxy-1,4-androstadien-3-one, melting point about 141–143° C., is prepared by warming a mixture of 1 part of 17β-hydroxy-1,4-androstadien-3-one, 8 parts of pyridine and 5 parts of propionic anhydride until complete solution results, allowing the solution to stand at about 25° C. for 16 hours, gradually diluting it with several times its volume of dilute sodium carbonate solution, and collecting the precipitated product on a filter.

A solution of 1.3 parts of 17β-propionoxy-1,4-androstadien-3-one in 1.5 parts of thiopropionic acid is heated at about 90–100° C. for 4 hours and then distilled under reduced pressure until the excess thiopropionic acid is removed as a distillate. The residue is crystallized from a mixture of ether and petroleum ether to afford 1α-propionylthio-17β-propionoxy-4-androsten-3-one which melts at about 136.5–138° C. The structural formula is

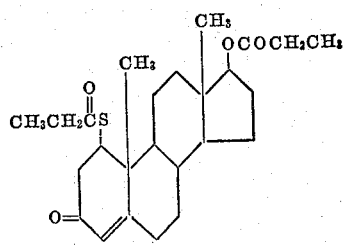

By the same procedure, with the substitution of 1.5 parts of thiobutyric acid for the thiopropionic acid, 17β-propionoxy-1,4-androstadien-3-one is converted to 1α-butyrylthio-17β-propionoxy-4-androsten-3-one.

*Example 6*

A solution of 6 parts of 1,4-androstadiene-3,17-dione in 6 parts of thioacetic acid is heated under reflux and irradiated with ultraviolet light for one hour. A crystalline product which begins to separate during this operation is collected by filtration of the cooled solution.

This product is washed with ether and with petroleum ether. It is 1α-acetylthio-4-androstene-3,17-dione which melts at about 198–200° C. and has a specific rotation of about +196° in chloroform solution. If desired, this compound can be recrystallized from a mixture of acetone and ether. The structural formula is

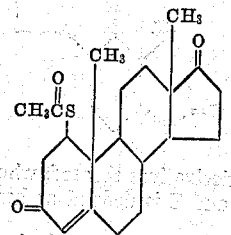

*Example 7*

A solution of 15 parts of 1,4-androstadiene-3,17-dione and 0.45 of p-toluenesulfonic acid monohydrate in 150 parts of 2-methyl-2-ethyl-1,3-dioxolane (the ethylene ketal of butanone) is distilled at such a rate that, after a period of about 5 hours, the solution has been concentrated to about one-third of its original volume. The reaction mixture is cooled and diluted with ether. The insoluble product is collected on a filter and washed with ether. This compound is 1,4-androstadiene-3,17-dione 17-ethylene monoketal melting at about 172–174° C. An additional quantity of product can be obtained by concentration of the liquor and further dilution with ether. If desired, this compound can be recrystallized from acetone. The structural formula, as shown by the elemental analysis, the absence of infrared absorption characteristic of an unconjugated carbonyl group, and the presence of infrared absorption characteristic of an α,β-unsaturated ketone grouping, is

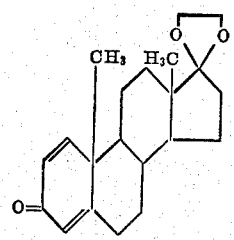

This compound is effective in reducing the salt retention produced by desoxycorticosterone.

*Example 8*

A solution of 2 parts of 1,4-androstadiene-3,17-dione 17-ethylene monoketal in 2 parts of thioacetic acid is heated under reflux and irradiated with ultraviolet light for one hour. The reaction mixture is concentrated to a very small volume by removing some of the excess thioacetic acid by distillation under reduced pressure. Crystallization of the residue is induced by the addition of ether and petroleum ether. The crystalline product is collected on a filter and then recrystallized from a mixture of acetone and ether. The compound obtained is 1α-acetylthio-4-androstene-3,17-dione 17-ethylene monoketal which melts at about 165–166.5° C. and has a specific rotation of about +88° in chloroform solution. The structural formula is

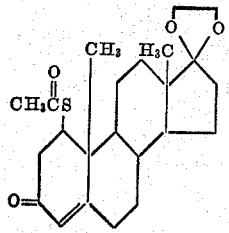

What is claimed is:
1. A compound selected from the class consisting of compounds having the structural formula

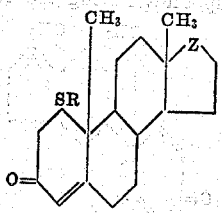

and 4,5-dihydro derivatives thereof; wherein R is a lower alkanoyl radical; and Z is a member of the class consisting of the carbonyl group, the hydroxymethylene group, and groups of the formula

CHOR' wherein R' is a lower alkanoyl radical.

2. A compound of the structural formula

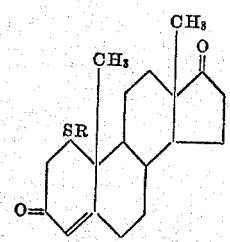

wherein R is a lower alkanoyl radical.

3. 1α-acetylthio-4-androstene-3,17-dione.

4. A compound of the structural formula

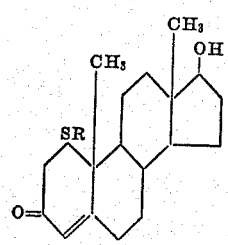

wherein R is a lower alkanoyl radical.

5. 1α-acetylthio-17β-hydroxy-4-androsten-3-one.

6. A compound of the structural formula

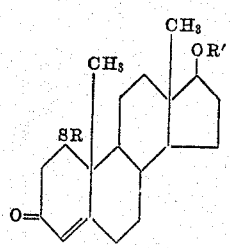

wherein R and R' are lower alkanoyl radicals.

7. 1α-acetylthio-17β-acetoxy-4-androsten-3-one.

8. A compound of the structural formula

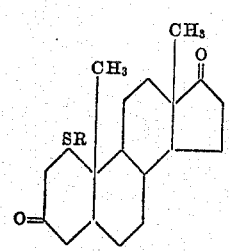

wherein R is a lower alkanoyl radical.

9. 1α-acetylthioandrostane-3,17-dione.

10. A process which comprises reacting a lower thioalkanoic acid with a compound selected from the class consisting of compounds having the structural formula

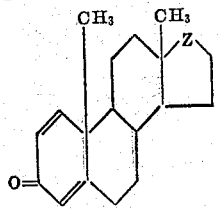

and 4,5-dihydro derivatives thereof; wherein Z is a member of the class consisting of the carbonyl group, the hydroxymethylene group, and groups of the formula

CHOR' wherein R' is a lower alkanoyl radical; and isolating a compound selected from the class consisting of compounds having the structural formula

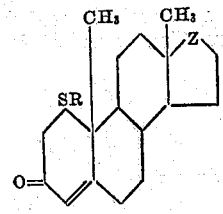

and 4,5-dihydro derivatives thereof; wherein R is a lower alkanoyl radical and Z is defined as hereinbefore.

No references cited.